(12) United States Patent
Wang et al.

(10) Patent No.: US 9,582,709 B2
(45) Date of Patent: Feb. 28, 2017

(54) PRIVACY FOR CAMERA WITH PEOPLE RECOGNITION

(71) Applicant: Multimedia Image Solution Limited, Dublin (IE)

(72) Inventors: Jin Wang, Hangzhou (CN); Lianbo Xu, Hangzhou (CN); Shuaibin Chen, Hangzhou (CN); Chengping Yang, Jiangsu (CN); Hui Deng, San Ramon, CA (US); Kaixuan Mao, Dublin, CA (US)

(73) Assignee: Hangzhou Closeli Technology Co., Ltd., Hangzhou (CN)

( * ) Notice: Subject to any disclaimer, the term of this patent is extended or adjusted under 35 U.S.C. 154(b) by 0 days.

(21) Appl. No.: 14/569,776

(22) Filed: Dec. 14, 2014

(65) Prior Publication Data

US 2016/0104035 A1 Apr. 14, 2016

(30) Foreign Application Priority Data

Oct. 9, 2014 (CN) .......................... 2014 1 0528458

(51) Int. Cl.
*G06K 9/00* (2006.01)
*H04N 5/232* (2006.01)
*H04N 21/60* (2011.01)
*H04N 21/431* (2011.01)
*H04N 21/44* (2011.01)

(52) U.S. Cl.
CPC ..... *G06K 9/00288* (2013.01); *G06K 9/00228* (2013.01); *H04N 21/4318* (2013.01); *H04N 21/44008* (2013.01); *H04N 21/60* (2013.01)

(58) Field of Classification Search
CPC .......... G06K 9/00288; G06K 9/00228; H04N 5/23219; H04N 5/23229
USPC ........................................................ 382/118
See application file for complete search history.

(56) References Cited

U.S. PATENT DOCUMENTS

| | | | | |
|---|---|---|---|---|
| 8,723,911 B1* | 5/2014 | Shochet | ................ | H04N 7/147 348/14.01 |
| 9,179,105 B1* | 11/2015 | Zeira | ..................... | H04N 5/2254 |
| 2005/0271251 A1* | 12/2005 | Russell | ............. | G06K 9/00288 382/103 |
| 2009/0109286 A1* | 4/2009 | Ennis | ..................... | A42B 3/042 348/81 |
| 2014/0023248 A1* | 1/2014 | Yoo | .................... | G06K 9/00288 382/118 |
| 2014/0347479 A1* | 11/2014 | Givon | ................ | G06K 9/00342 348/143 |
| 2015/0104103 A1* | 4/2015 | Candelore | .......... | G06K 9/00288 382/195 |

* cited by examiner

*Primary Examiner* — Jon Chang
(74) *Attorney, Agent, or Firm* — Patent Law Group LLP; David C. Hsia

(57) ABSTRACT

A method to provide privacy protection on a video includes performing people recognition on the video, when a registered person is recognized, determining if a privacy setting is turned on, and, when the privacy setting is turned on, performing privacy protection on the video. Performing privacy protection on the video includes pausing a recording of a live video, obscuring the registered person in the live video or a recorded video, or skipping ahead or deleting part of the recorded video.

20 Claims, 3 Drawing Sheets

PRIVACY FOR CAMERA WITH PEOPLE RECOGNITION

BACKGROUND

A wireless security camera captures a live video and streams it over the Internet for remote viewing so a user stays connected with places, people, and pets, no matter where the user is located. Some wireless security camera manufacturers or third parties offer a recording service to store footage for the user to review afterwards.

BRIEF DESCRIPTION OF THE DRAWINGS

In the drawings.

Use of the same reference numbers in different figures indicates similar or identical elements.

DETAILED DESCRIPTION

As used herein, the term "includes" means includes but not limited to, the term "including" means including but not limited to. The terms "a" and "an" are intended to denote at least one of a particular element. The term "based on" means based at least in part on. The term "or" is used to refer to a nonexclusive such that "A or B" includes "A but not B," "B but not A," and "A and B" unless otherwise indicated.

In examples of the present disclosure, a server computer with a security monitor and recorder provides privacy protection on a video. When the server computer recognizes a registered person from the video, the server computer determines a privacy setting for the registered person. When the privacy setting is turned on, the server computer performs privacy protection on the video. Privacy protection may be pausing a recording of a live video, obscure the registered person (e.g., obscuring the face, the person, or the entire video) in the live video or a recorded video, or skipping ahead or deleting part of the recorded video. When the registered person does not appear in the video or an unregistered person appears with the registered person in the video, the server computer may stop performing privacy protection on video.

Figure 1:
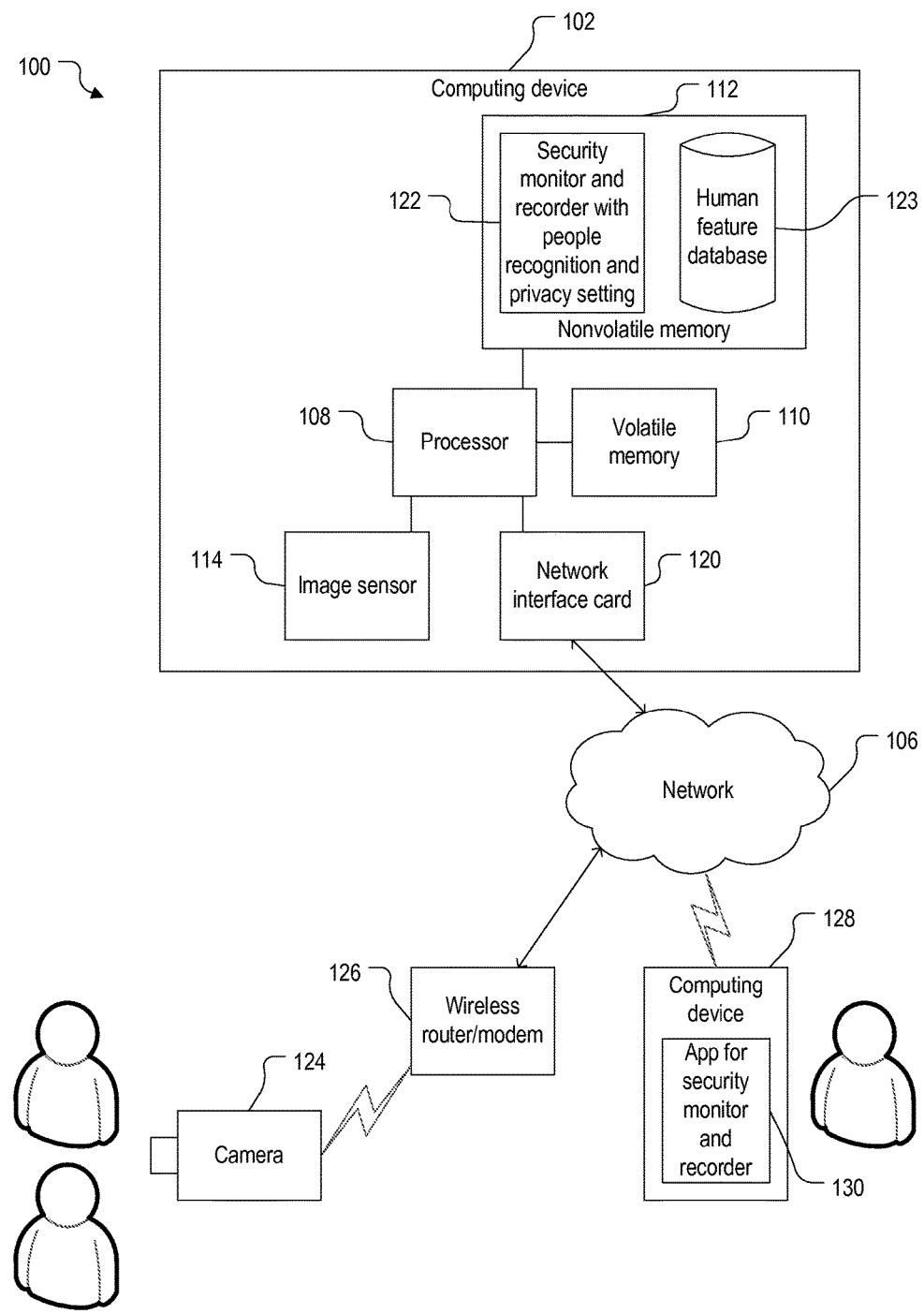
FIG. 1 is a block diagram of a computing device with a security monitor and recorder equipped with people recognition and privacy setting in examples of the present disclosure.

FIG. 1 is a block diagram of a system 100 including a computing device 102 with a security monitor and recorder 122 equipped with people recognition and privacy settings in examples of the present disclosure. Computing device 102 may be a server computer. Alternatively computing device 102 may be a smart security camera.

Computing device 102 includes a processor 108, a volatile memory 110, a nonvolatile memory 112, an image sensor 114, and a wired or wireless network interface card (NIC) 120. Nonvolatile memory 112 stores the code of security monitor and recorder 122. Nonvolatile memory 112 also stores human features and registration information in a human feature database 123 for recognizing registered persons. Processor 108 loads the code of security monitor and recorder 122 from nonvolatile memory 112 to volatile memory 110, executes the code, and stores application data in volatile memory 110. When computing device 102 is a server computer, processor 108 may use NIC 120 to receive a live video from a camera 124 over a network 106. Camera 124 may be a wireless security camera coupled by a wireless router or modem 126 to network 106. Alternatively camera 124 may be a camera on a laptop computer or a television coupled by wireless router or modem 126 to network 106. When computing device 102 is a smart security camera, processor 108 may use image sensor 114 to capture a live video. Processor 108 may also use NIC 120 to receive user input from and send user notifications to a user's computing device 128. Computing device 128 may be a mobile phone, a tablet computer, a laptop computer.

Figure 2:
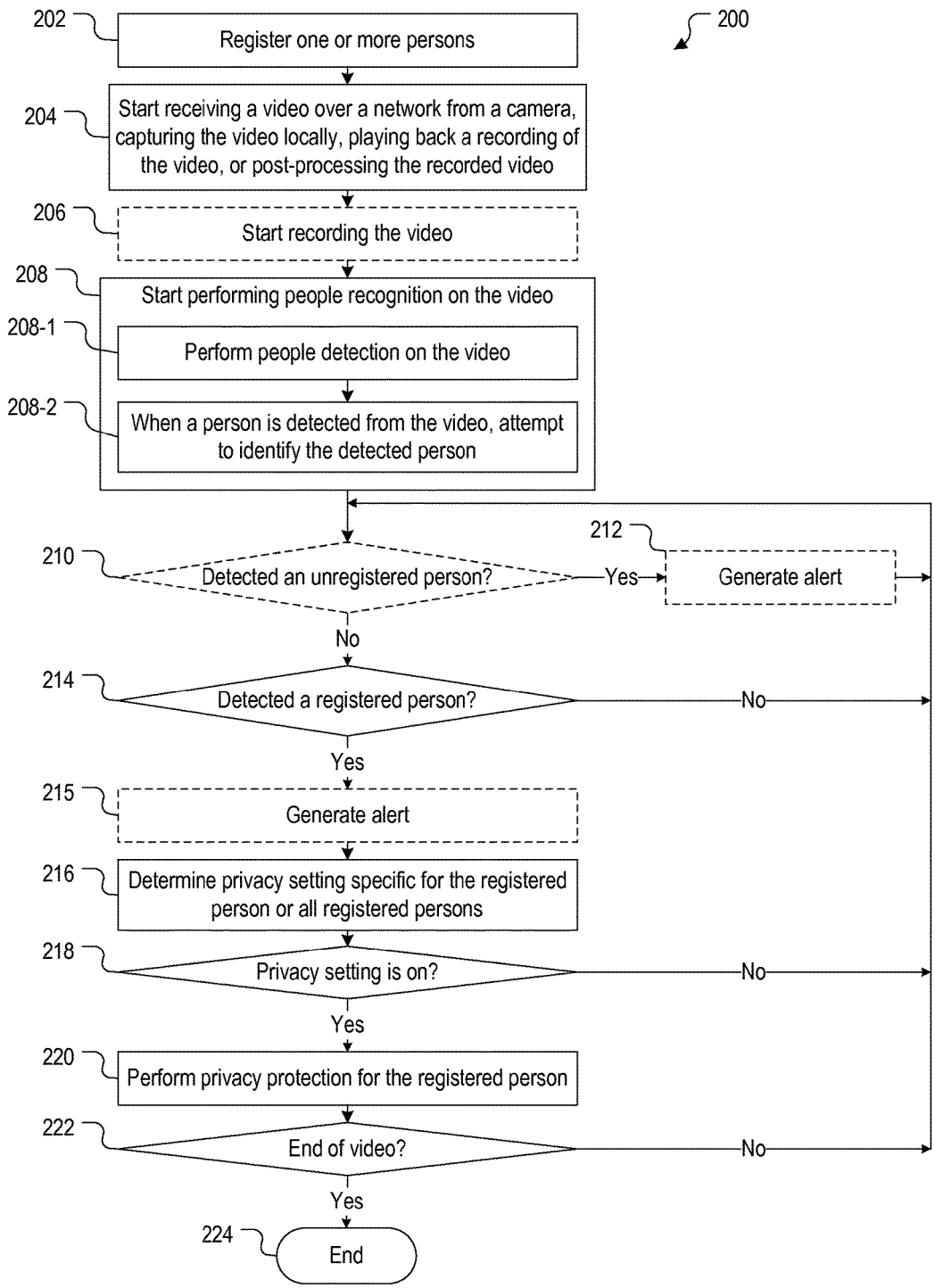
FIG. 2 is a flowchart of a method for the security monitor and recorder of FIG. 1 to provide privacy protection on a video in one or more embodiments of the present disclosure.

FIG. 2 is a flowchart of a method 200 for security monitor and recorder 122 to provide privacy protection in one or more embodiments of the present disclosure. Method 200 may be implemented by processor 108 (FIG. 1) executing the code of security monitor and recorder 122 (FIG. 1). Method 200 may include one or more operations, functions, or actions illustrated by one or more blocks. Although the blocks of method 200 and other methods described herein are illustrated in sequential orders, these blocks may also be performed in parallel, or in a different order than those described herein. Also, the various blocks may be combined into fewer blocks, divided into additional blocks, or eliminated based upon the desired implementation. Method 200 may begin in block 202.

In block 202, processor 108 registers one or more new persons.

Figure 3:
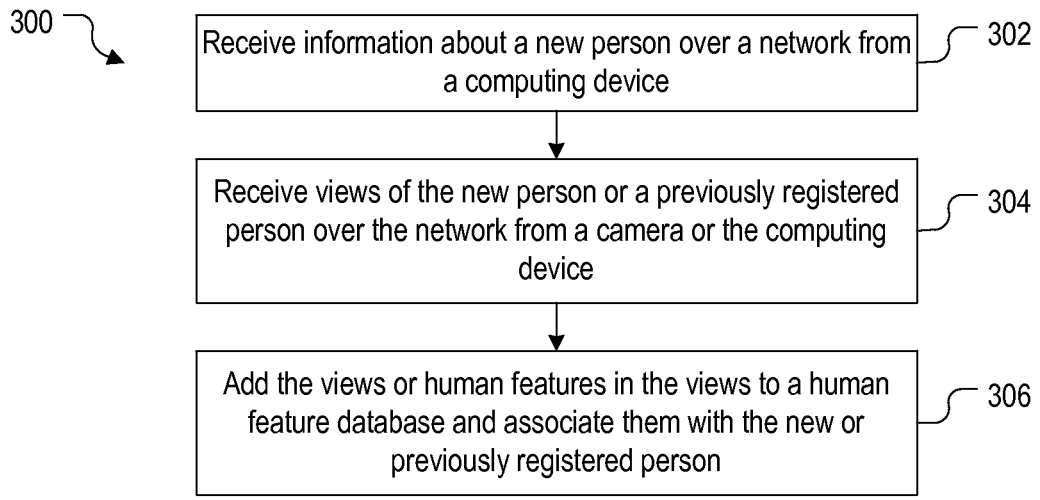
FIG. 3 is a flowchart of a method for the security monitor and recorder of FIG. 1 to register a new person in examples of the present disclosure.

FIG. 3 is a flowchart of a method 300 for security monitor and recorder 122 to register a new person in examples of the present disclosure. Method 300 may be implemented by processor 108 executing the code of security monitor and recorder 122. Method 300 may begin in block 302.

In block 302, processor 108 receives information about the new person, such as a name and privacy settings, from a computing device (e.g., computing device 128). The privacy settings may be specific to the new person or general to all registered persons. Block 302 may be followed by block 304.

In block 304, processor 108 receives multiple views of the new person or a previously registered person over network 106 from camera 124 or computing device 128. The views allow a person to be identified by shape, color, or motion. For example, the views capture human features of the new person, such as facial features. Other human features include hairstyle, age, height, clothes, body gestures, motion patterns. For example, the views may capture the new person's face in a front view at eye-level, a front view looking up, a front view looking down, a left profile view, and a right profile view. Computing device 128 may have an application 130 (FIG. 1) that captures the multiple views with camera 124 or a camera on computing device 128. Block 304 may be followed by block 306.

In block 306, processor 108 adds the views or human features from the views to human feature database 123 (FIG. 1) and associates them with the new person's profile or a previously registered person's profile.

Referring back to FIG. 2, block 202 may be followed by block 204.

In block 204, processor 108 starts receiving a video live over network 106 (FIG. 1) from remote camera 124 (FIG. 1), capturing the video live with local image sensor 114 (FIG. 1), playing back a recording of the video, or post-processing the recorded video. Block 204 may be followed by optional block 206.

In optional block 206, processor 108 starts to record the video. Block 206 may be optional because processor 108 may be processing a recorded video. Optional block 206 may be followed by block 208.

In block 208, processor 108 starts to perform people recognition on the video. Block 208 may include sub-blocks 208-1 and 208-2.

In sub-block 208-1, processor 108 performs people detection on the video. In some examples of the present disclosure, processor 108 performs people detection based on shape, color, and motion. For example, processor 108 may perform people detection based on shapes and colors of the human face, body, or clothes in the live video. Sub-block 208-1 may be followed by sub-block 208-2.

In sub-block 208-2, when a person is detected in sub-block 208-1, processor 108 attempts to identify the detected person. In some examples of the present disclosure, processor 108 attempts to identify the detected person based on human features. For example, processor 108 may compare human features, such as facial features, of the detected person to those in human feature database 123 to determine if the detected person is one of the registered persons. Other human features include hairstyle, age, height, clothes, accessories, postures, body gestures, motion patterns. Instead of using human feature database 123, processor 108 may implement a learning classifier to identify the detected person. The learning classifier may be trained with positive and negative samples of the registered persons. The training may be ongoing with new views of registered person detected in sub-block 208-1 that the user identify as positive or negative samples of the registered persons.

Block 208 may be followed by optional block 210.

In optional block 210, processor 108 determines if it has detected an unregistered person. In other words, processor 108 determines if it has failed to identify the detected person as one of the registered persons. If so, optional block 210 may be followed by optional block 212. Otherwise optional block 210 may be followed by block 214.

In optional block 212, processor 108 generates an alert. When processor 108 is processing a live video, processor 108 may send a notification in real-time over network 106 to computing device 128 to warn the user the presence of the unregistered person (e.g., an intruder). The notification may appear as an email, a text message, or an alert on application 130 on computing device 128. Optional block 212 may loop back to optional block 210 to process another detected person. Blocks 210 and 212 may be optional because the user may turn on or off such an alert.

In block 214, processor 108 determines if it has detected a registered person. In other words, processor 108 determines if it has identified the detected person as one of the registered persons. If so, block 214 may be followed by optional block 215. Otherwise block 214 may loop back to optional block 210 to process another detected person.

In optional block 215, processor 108 generates an alert. When processor 108 is processing a live video, processor 108 may send a notification in real-time over network 106 to computing device 128 to inform the user the presence of the registered person (e.g., a child returning home). The notification may appear as an email, a text message, or an alert on application 130 on computing device 128. Optional block 215 may be followed by block 216. Block 215 may be optional because the user may turn on or off such an alert.

In block 216, processor 108 determines a privacy setting for the registered person. The privacy setting may be specific to the registered person or general to all registered persons. Block 216 may be followed by block 218.

In block 218, processor 108 determines if the privacy setting is turned on. If so, block 218 may be followed by block 220. Otherwise block 218 may loop back to optional block 210 to process another detected person.

In block 220, processor 108 performs privacy protection. Privacy protection may be performed in multiple ways. For either live or recorded video, processor 108 may obscure the registered person (e.g., blur or place a mask on the registered person's face or blur or mask the entire video). For a live video, processor 108 may pause the recording of the video while the registered person appears in the video, and processor 108 may resume the recording of the video when the registered person does not appear in the video. Processor 108 may also resume the recording of the video when an unregistered person appears with the registered person in the video unless this is overridden by another privacy setting for the registered person or all of the registered persons. For a playback of a recorded video, processor 108 may skip ahead or delete part of the video until the registered person is not in the video. Processor 108 may also skip ahead or delete part of the video until an unregistered person appears with the registered person in the video unless this is overridden by the other privacy setting for the registered person or all of the registered persons. Block 220 may be followed by block 222.

In block 222, processor 108 determines if it has reached the end of the video. If processor 108 has reached the end of the video, block 222 may be followed by block 224 that ends method 200. Otherwise block 222 may loop back to optional block 210 to process another detected person.

Figure 4:
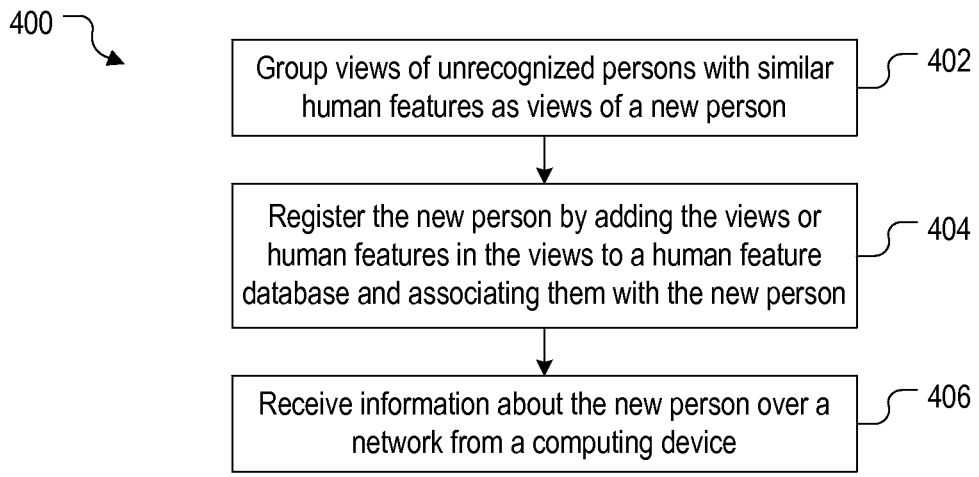
FIG. 4 is a flowchart of another method for the security monitor and recorder of FIG. 1 to register a new person in examples of the present disclosure.

FIG. 4 is a flowchart of a method 400 for security monitor and recorder 122 to register a new person in examples of the present disclosure. Unlike method 300 where a user registers a new person, method 400 automatically registers a new person. Method 400 may be implemented by processor 108 (FIG. 1) executing the code of security monitor and recorder 122 (FIG. 1). Method 400 may begin in block 402.

In block 402, processor 108 groups views of unrecognized persons with similar human features. An unrecognized person is detected when processor 108 performs people detection but is unable to match the detected person to any registered person. The views of the unrecognized persons with similar human features are assumed to be different views of a new person. Block 402 may be followed by block 404.

In block 404, processor 108 registers the new person based on the views. For example, processor 108 adds the views or human features from the views to the new registered person's profile in human feature database 123 (FIG. 1) and associating them with the new person. Block 404 may be followed by block 406.

In block 406, processor 108 receives information about the new registered person over network 106 (FIG. 1) from computing device 128. As in method 300, the information may include a name and a privacy setting. The privacy setting may be specific to the new person or general to all registered persons. Processor 108 may also receive the rejection of one or more views wrongly associated with the new registered person or the association of one or more views to an already registered person and include these views to the already registered person's profile.

Various other adaptations and combinations of features of the embodiments disclosed are within the scope of the present disclosure. Numerous embodiments are encompassed by the following claims.

What is claimed is:

1. A method to protect privacy in a video, comprising:
   recording or transmitting the video;
   registering a new person by:
      receiving multiple views of the new person over a network from a remote camera; and
      associating the multiple views with the new person;
   performing people recognition on the video, comprising:
      performing people detection on the video; and
      when a person is detected from the video, attempting to identify the detected person;
   when a registered person is identified, determining if a privacy setting is turned on; and
   when the privacy setting is turned on, performing privacy protection on the video.

2. The method of claim 1, further comprising receiving the video live over the network from the remote camera or capturing the video live with a local image sensor.

3. The method of claim 1, wherein the video is a recorded video and the method further comprises playing back or post-processing the recorded video.

4. The method of claim 1, wherein the privacy setting is specific to some registered persons or all of the registered persons.

5. The method of claim 1, wherein performing privacy protection comprises:
   pausing the recording of the video while the registered person appears in the video; and
   when the registered person no longer appears in the video, resuming the recording of the video.

6. The method of claim 1, wherein performing privacy protection comprises:
   pausing the recording of the video while the registered person appears in the video; and
   when an unregistered person appears in the video with the registered person, resuming the recording of the video based on the privacy setting unless overridden by another privacy setting.

7. The method of claim 1, wherein attempting to identify the detected person comprises comparing human features of the detected person against those in a database to determine if the detected person is one of the registered persons.

8. The method of claim 1, wherein attempting to identify the detected person comprises using a learning classifier to determine if the detected person is one of the registered persons.

9. The method of claim 1, when an unregistered person is detected, further comprising sending a notification over the network to a computing device.

10. The method of claim 1, when the registered person is identified, further comprising sending a notification over the network to a computing device.

11. The method of claim 1, further comprising:
   receiving multiple views of a previously registered person over the network from a remote camera; and
   associating the multiple views with the previously registered person.

12. A method to protect privacy in a video, comprising:
   recording or transmitting the video;
   registering a new person, comprising:
      group multiple views of unrecognized persons with similar human features as the multiple views of the new person; and
      automatically associating the multiple views with the new person;
   performing people recognition on the video, comprising:
      performing people detection on the video; and
      when a person is detected from the video, attempting to identify the detected person;
   when a registered person is identified, determining if a privacy setting is turned on; and
   when the privacy setting is turned on, performing privacy protection on the video.

13. The method of claim 12, further comprising receiving the video live over a network from a remote camera or capturing the video live with a local image sensor.

14. The method of claim 12, wherein the video is a recorded video and the method further comprises playing back or post-processing the recorded video.

15. The method of claim 12, wherein the privacy setting is specific to some registered persons or all of the registered persons.

16. The method of claim 12, wherein performing privacy protection comprises:
   pausing the recording of the video while the registered person appears in the video; and
   when the registered person no longer appears in the video, resuming the recording of the video.

17. The method of claim 12, wherein performing privacy protection comprises:
   pausing the recording of the video while the registered person appears in the video; and
   when an unregistered person appears in the video with the registered person, resuming the recording of the video based on the privacy setting unless overridden by another privacy setting.

18. The method of claim 12, wherein attempting to identify the detected person comprises comparing human features of the detected person against those in a database to determine if the detected person is one of the registered persons or using a learning classifier to determine if the detected person is one of the registered persons.

19. The method of claim 12, when an unregistered person is detected or the registered person is identified, further comprising sending a notification over a computer network to a computing device.

20. The method of claim 12, further comprising:
   receiving multiple views of a previously registered person over a network from a remote camera; and
   associating the multiple views with the previously registered person.

* * * * *